(12) United States Patent
Lai et al.

(10) Patent No.: US 7,408,855 B2
(45) Date of Patent: Aug. 5, 2008

(54) DISK DRIVE WITH AN ADJUSTABLE MOTOR AND METHOD FOR ADJUSTING ROTATION SPEED OF THE MOTOR

(75) Inventors: Sheng Lai, Taipei (TW); An-Pang Lin, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 687 days.

(21) Appl. No.: 11/097,228

(22) Filed: Apr. 4, 2005

(65) Prior Publication Data

US 2005/0237907 A1 Oct. 27, 2005

(30) Foreign Application Priority Data

Apr. 27, 2004 (TW) ................... 93111726

(51) Int. Cl.
G11G 19/00 (2006.01)

(52) U.S. Cl. .................................... 369/47.39

(58) Field of Classification Search ............. 369/47.38, 369/47.39
See application file for complete search history.

(56) References Cited

U.S. PATENT DOCUMENTS

| | | | |
|---|---|---|---|
| 4,809,248 A * | 2/1989 | Sengoku ................. 369/53.3 |
| 6,940,793 B2 * | 9/2005 | Yamashita et al. ........ 369/47.39 |
| 7,089,410 B2 * | 8/2006 | Sato et al. ............... 360/73.07 |
| 7,339,862 B2 * | 3/2008 | Takenaka ................ 369/47.41 |
| 2005/0007918 A1 * | 1/2005 | Tokudome et al. ........ 369/47.36 |

* cited by examiner

*Primary Examiner*—Thang V. Tran
(74) *Attorney, Agent, or Firm*—Birch, Stewart, Kolasch & Birch, LLP

(57) ABSTRACT

A method for adjusting rotation speed of a driving motor in a disk drive prior to power on of a computer, includes: (i) inputting an external signal into the disk drive; (ii) converting the external signal into a predetermined value in such a manner to replace a default value stored within a memory device by the predetermined value such that the memory device is eventually stored with the predetermined value; and (iii) rotating the driving motor according to the predetermined value.

10 Claims, 5 Drawing Sheets

DISK DRIVE WITH AN ADJUSTABLE MOTOR AND METHOD FOR ADJUSTING ROTATION SPEED OF THE MOTOR

FIELD OF THE INVENTION

The invention relates to a disk drive, more particularly to a disk drive with an adjustable motor and method for adjusting rotation speed of the motor.

BACKGROUND OF THE INVENTION

The rapid advent of personal computer brings lots of improvement to the external peripheral devices. A hard disk, a disk drive, an optical recording and reproducing instrument (DVD player), an image scanner, and a printing machine are some common external peripheral devices and are generally used in offices. Among them, the disk drive is prevalent for data storage. The DVD (digital versatile disc) of the latest development has 17 GB storage capacity, possesses high transmission characteristics, and causes wide utility of the DVD player by the consumers.

FIG. 1 shows a partly perspective view of a conventional disk drive 100 to include a driving motor 120 for rotating an optical disk 200 disposed thereabove, and a reading mechanism 140. The reading mechanism 140 includes a guide rail 142 and a pick-up head 144 retained slidably in the guide rail 142 below the optical disk 200 for reading the same. During the reading operation, the laser beam in the pick-up head 144 will focus continuously along the track in the optical disk 200 so as to read the data while traveling reciprocally along the guide rail 142.

The driving motor 120 needs to rotate at high speed in order to increase the reading capacity of the pick-up head 144. Presently, in some of the disk drives, the driving motor is arranged in such a manner to rotate the most at 10000 rpm. However, when the driving motor is thus arranged, the following drawbacks result:

(i) chucking noise results due to high rotation speed of the optical disk 200;

(ii) vibration of the optical disk 200 caused due to high rotation speed along a horizontal plane may cause indefinite focusing and tracking of the laser beam in the pick-up head 144;

(iii) vibration of the optical disk 200 is aggravated in case the latter itself is formed with scratches, labels, or deformed track, and eventually may lead to a sudden rupture of the optical disk under high rotation.

SUMMARY OF THE INVENTION

Therefore, the object of the present invention is to provide a disk drive having an adjustable motor which is adapted to adjustably rotate the optical disk and the method thereof for adjusting the rotating speed of the driving motor so as to overcome the aforesaid drawbacks resulting from the use of the conventional disk drive.

A method for adjusting rotation speed of a driving motor in a disk drive prior to switching on of a computer is proposed in accordance with the present invention. The method comprising the steps of: (a) inputting an external signal into the disk drive; (b) converting the external signal into a predetermined value in such a manner to replace a default value stored within a memory device by the predetermined value such that the memory device is eventually stored with the predetermined value, wherein the default and predetermined values are different from each other; and (c) rotating the driving motor according to the predetermined value.

In another aspect of the present invention, a disk drive is proposed to include: a driving motor for driving an inserted optical disk; an external module for generating an external signal; a memory device stored with a default value; a converter linked to the external module and the memory device, and capable of converting the external signal inputted from the external module into a predetermined value different from the default value in such a manner to replace the default value by the predetermined value such that the memory device is eventually stored with the predetermined value; and a control unit for adjusting the driving motor to rotate according to the predetermined value. The converter is activated when electricity is flowed thereinto and is de-activated after detecting and converting the external signal into the predetermined value.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1:
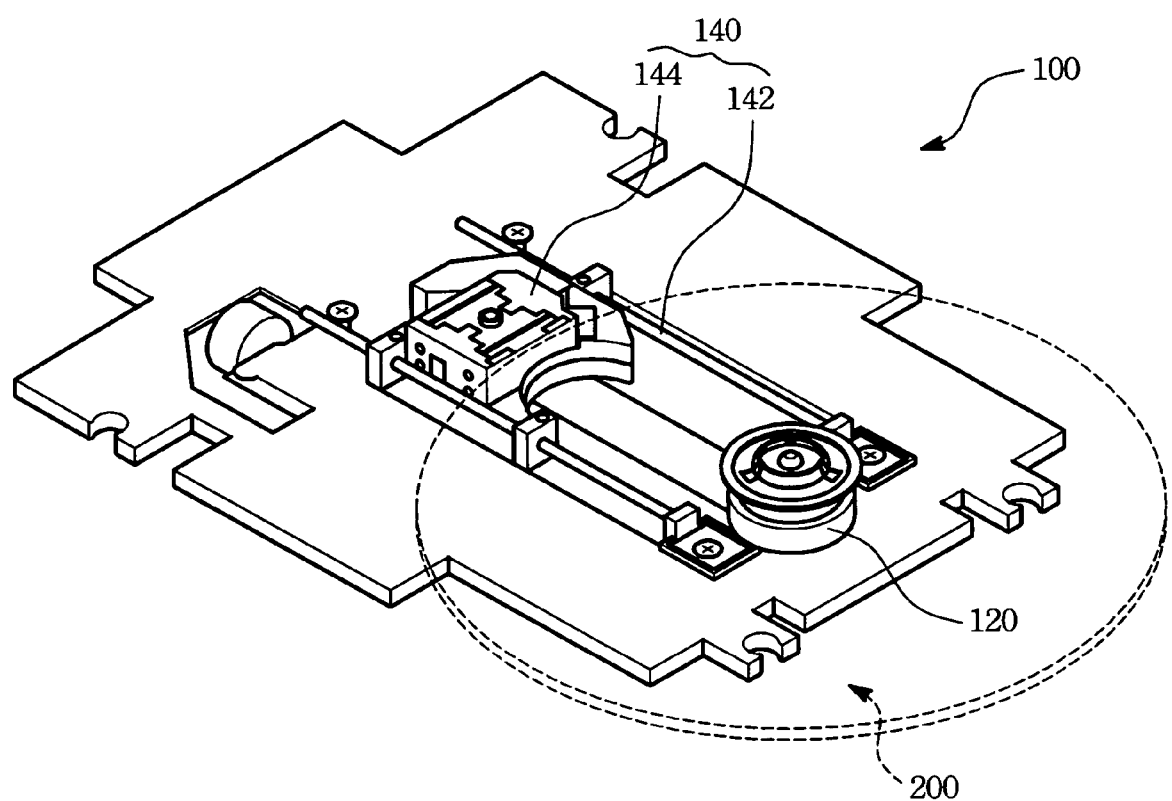
FIG. 1 is a partly perspective view of a conventional disk drive, illustrating how a pick-up head for reading an optical disk is actuated.
Figure 2:
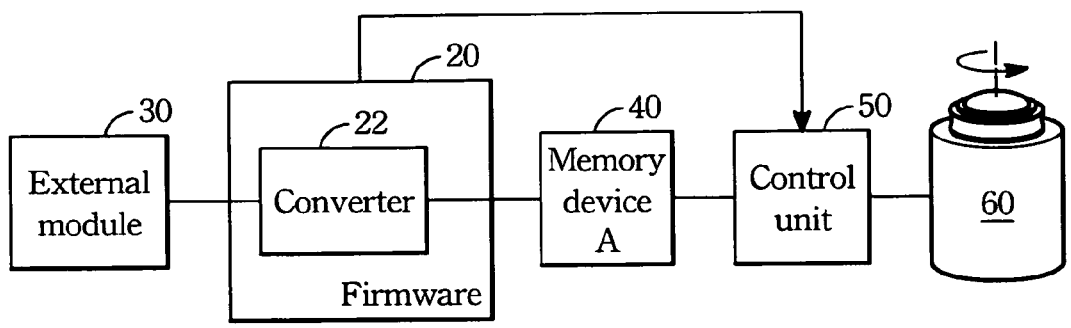
FIG. 2 is a block diagram, illustrating the components of the preferred embodiment of a disk drive according to the present invention.

Referring to FIG. 2, the preferred embodiment of a disk drive according to the present invention is shown to include a driving motor 60 for driving an inserted optical disk (see FIG. 1), an external module 30, a memory device 40, a firmware 20, and a control unit 50. The disk drive is generally installed within a personal computer for reading the inserted optical disk.

As illustrated, the firmware 20 is provided with a signal converter 22 that is linked to the external module 30 and the memory device 40. The external module 30 is capable of inputting an external signal into the converter 22, where the external signal is converted into a predetermined value (A) which is stored within the memory device 40 in such a manner that the firmware 20 will drive the driving motor 60 via the control unit 50 to rotate at a specific speed corresponding to the predetermined value (A).

Figure 3A:
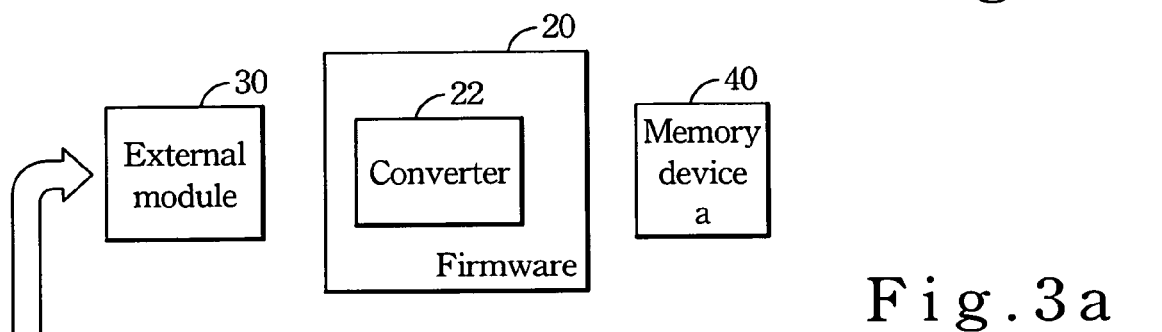
FIGS. 3a to 3c respectively show the components and the preferred embodiment according to the method of the present invention, illustrating the steps for adjusting rotation speed of the driving motor in the disk drive.
Figure 3B:
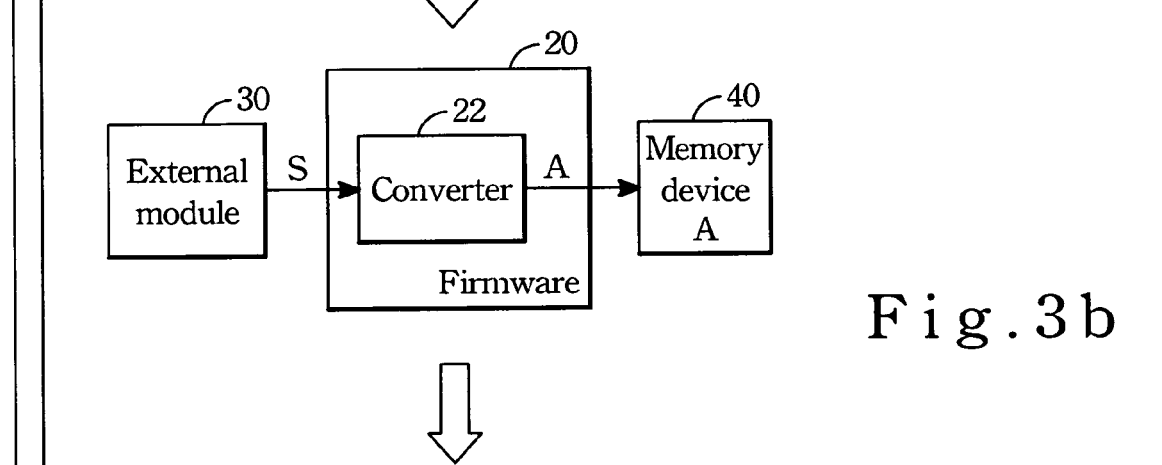
Figure 3C:
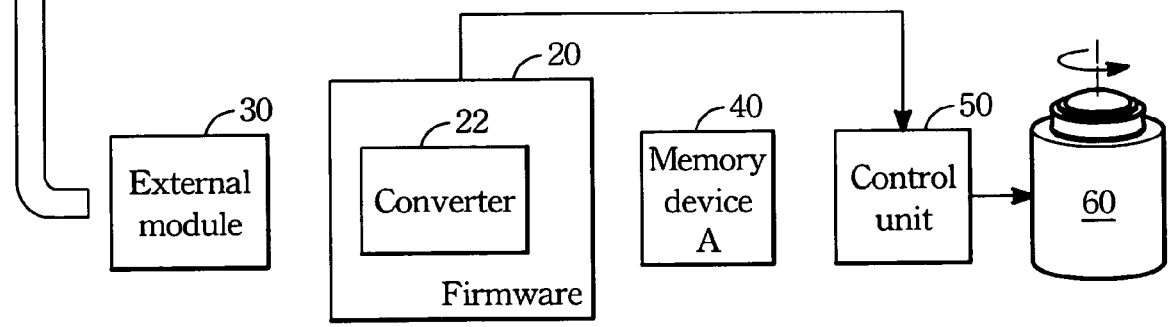

Referring FIGS. 3a to 3c, the method for adjusting the rotation speed of the driving motor 60 in the disk drive of the present invention is shown. As illustrated in FIG. 3a, the memory device 40 is stored in advance with the default value (a), i.e. the driving motor 60 is arranged to rotate at the high speed under the safe condition. According to FIG. 3b, the external module 30 inputs an external signal (S) into the firmware 20. The inputting operation can be done by pressing a press button for a specific time second on the external panel of the disk drive of the present invention such that the converter 22 converts the external signal (S) into a predetermined value (A) in such a manner that the default value (a) within the memory device 40 is replaced by the predetermined value (A). Note that the predetermined value (A) is smaller than the default value (a) such that the firmware 20 will drive the driving motor 60 via the control unit 50 to rotate at a low speed.

In fact, rotation of the driving motor 60 at high or low speed depends on actuation of the press button formed on the external panel on the disk drive of the present invention. In case, the default value is "0", the input external signal should be "1". A volatile memory can be employed in the disk drive of the present invention in order that the volatile memory is stored with the default value "0". Under this condition, when the user inputs the external signal (S), the default value "0" in the volatile memory will be replaced by the predetermined value "1" by virtue of electricity flow thereinto. Upon cessation of the electric flow into the volatile memory, the latter will be stored with "0" again.

Figure 4:
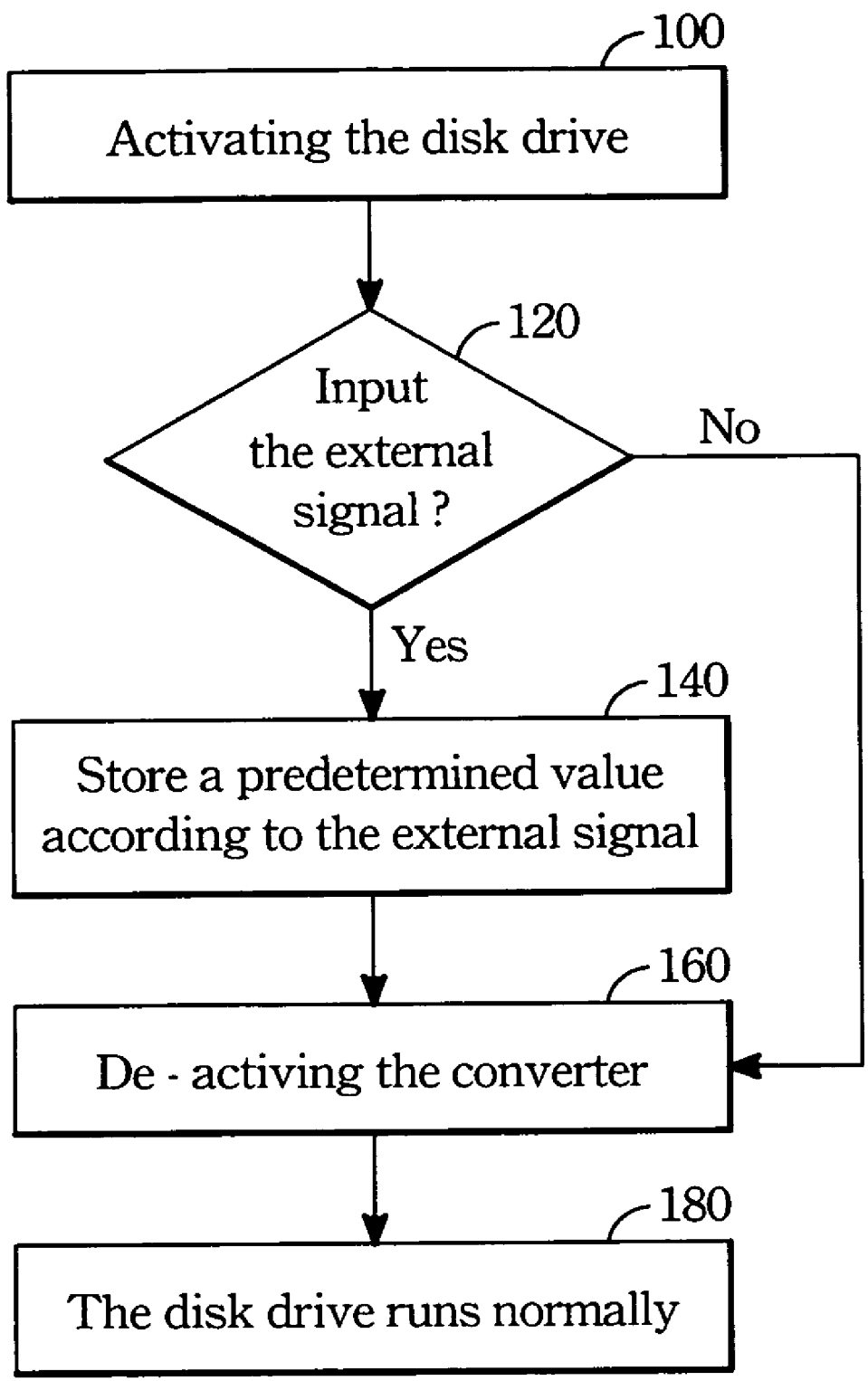
FIGS. 4 is a block diagram representing the steps according the preferred embodiment of the method of the present invention.

FIG. 4 shows the block diagram representing the method for adjusting the rotation speed of the driving motor in the disk drive of the present invention. According step 100, the disk drive is activated when the personal computer is switched on. Step 120, the user may select to actuate the press button (such as an ejection switch) or not. In case, the user selects to press the button, the default value "a" in the memory device is replaced by the predetermined vale "A" according to the inputted external signal (S). The converter is de-activated after detecting the predetermined value "A" according the step 160. Step 180, under this condition, the firmware 20 will rotate the driving motor via the control unit 50 according the predetermined value "A". The aforesaid adjustment of the rotation speed of the driving motor is completed prior to initialization of the operating system in the personal computer so that normal operation of the personal computer is not affected by rotation adjustment of the driving motor in the disk drive.

Figure 5A:
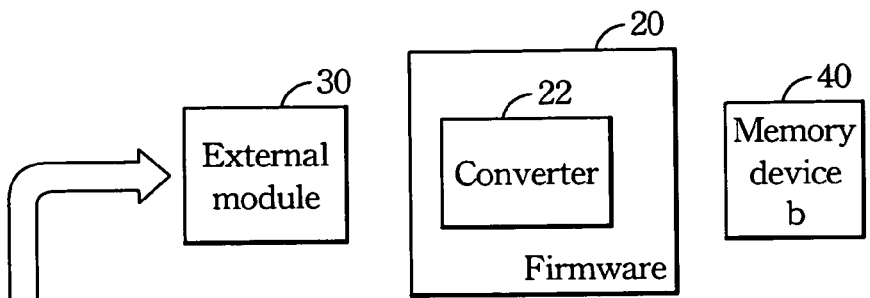
FIGS. 5a to 5d respectively show the components and the modified preferred embodiment according to the method of the present invention, illustrating the steps for adjusting rotation speed of the driving motor in the disk drive.

Referring FIGS. 5a to 5d, the method for adjusting the rotation speed of the driving motor in the modified disk drive of the present invention is shown. As illustrated in FIG. 5a, the memory device 40 employed herein is a non-volatile memory device and is stored in advance with the default value (b), i.e. the driving motor 60 is arranged to rotate at the high speed under the safe condition. According to FIG. 5b, the external module 30 inputs an external signal (S) into the firmware 20. The inputting operation can be done by pressing a press button on the external panel of the disk drive of the present invention for a specific time second such that the converter 22 converts the external signal (S) into a predetermined value (B) in such a manner that the default value (b) within the non-volatile memory device 40 is replaced by the predetermined value (B). Note that the predetermined value (B) is smaller than the default value (b)) such that the firmware 20 will drive the driving motor via the control unit to rotate at a low speed.

Figure 5B:
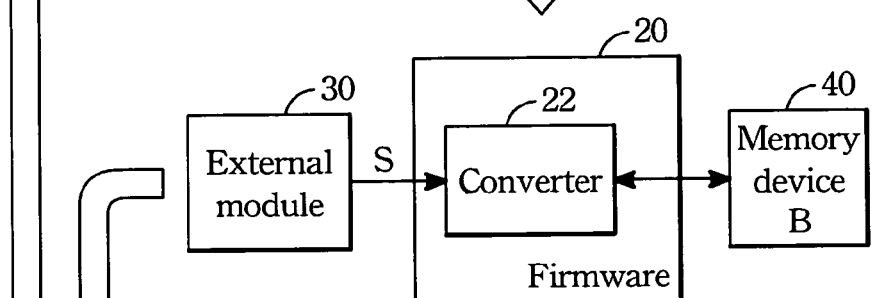
Figure 5C:
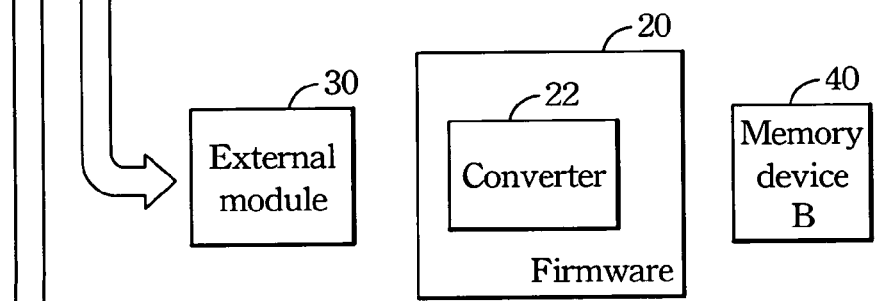
Figure 5D:
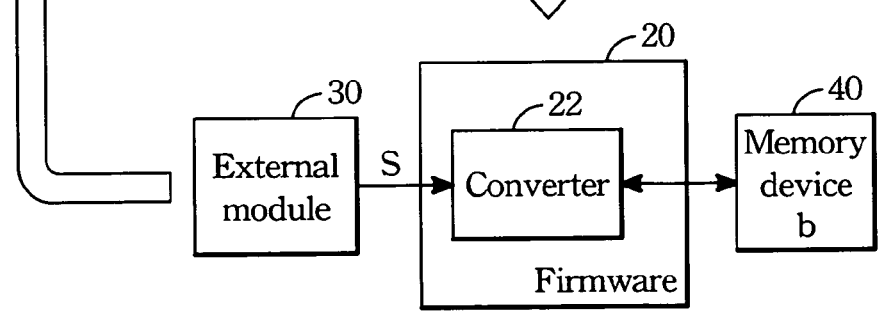

FIGS. 5b and 5c respectively illustrate the state prior to and after re-start of the personal computer such that the non-volatile memory 40 is stored with the predetermined value "B". Note that the value stored within the non-volatile memory device for driving the motor is not affected regardless of re-start operation of the personal computer.

Referring to FIG. 5c, in case the default value(b) stored within the non-volatile memory device 40 is (B). When the external module 30 inputs the external signal "S" into the firmware 20, the default value (b) within the non-volatile memory device 40 will be replaced by the predetermined value (B) by virtue of conversion of the external signal (S) with the assistance of the converter 22, which is generally the same as that prior to power on of the personal computer, as best shown in the step FIG. 5a. In the preferred embodiment, a flash memory can be used instead of the non-volatile memory device 40. According the above-mentioned facts, the storage ability of the non-volatile memory device is not affected no matter the latter is electrically connected to or disconnected from a power source. The input of the external signal (S) only results in replacement of the default value (b) in the memory device by the predetermined value (B).

Figure 6A:
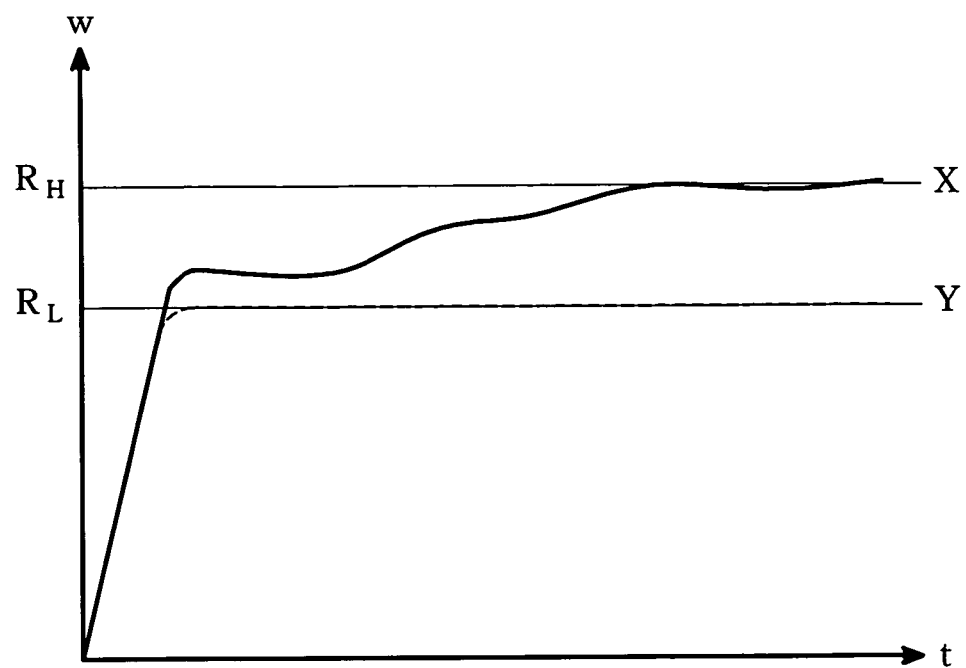
FIG. 6a shows a graph representing the state when the rotation speed of the driving motor in the disk drive of the present invention is adjusted from a high speed to a low speed.

FIG. 6a is a graph illustrating a first embodiment of the rotation speed adjustment of the driving motor from an original high speed mode to a relative low speed mode in the disk drive. The deviation of the curved line is due to the variation of gravity center and weight of the optical disk. The curved line X represents the angular speed of the driving motor in the high speed mode, while the curved line Y represents the angular speed of the driving motor in the low speed. Note that by setting an angular speed limitation $R_L$ in the low speed mode, the lines X and Y overlap each other prior to achieving the predetermined low speed $R_L$. After a time interval (i.e., after achieving the predetermined low speed), the line X continues to climb upward until it reaches a preset high speed $R_H$. However, the line Y is retained at the set angular speed limitation.

Figure 6B:
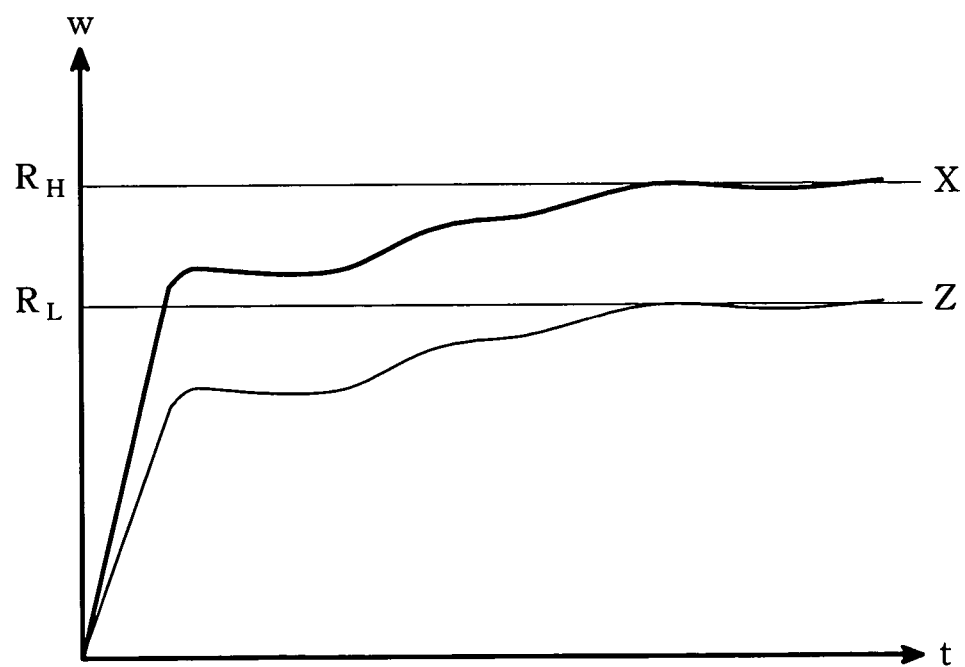
FIG. 6b shows a graph representing the state when the rotation of the driving motor in the modified disk drive of the present invention is adjusted from a high speed to a low speed.

FIG. 6b is a graph illustrating a second embodiment of the rotation speed adjustment of the driving motor from an original high speed mode to the relative low speed mode in the drive of the present invention. The curved line X represents the angular speed of the driving motor in the high speed mode, while the curved line Z represents the angular speed of the driving motor in the low speed mode. Note that the lines X and Z change under a predetermined ratio identical to a ratio of the predetermined high and low speed limitations $R_H$, $R_L$, respectively. In other word, the rotation speed of the driving motor is lowered under the predetermined ratio.

The advantages of the disk drive of the present invention are as follows:

(i) the rotation speed of the driving motor in the disk drive can be adjusted according to the user's requirement. When the user needs a quiet environment and when the user feels the poor quality of the optical disk, the speed for reading the optical disk can be lowered and vice versa;

(ii) adjustment of the reading speed of the pick-up head does not affect the normal operation of the personal computer since the former is completed prior to starting up of the operation system of the personal computer; and (iii) since the converter 22, the external module 30, the control unit 40 and the memory device 50 are already present in the disk drive 10, a mere installation of the firmware 20 into the disk drive 10 by enclosing the converter 22 thereinto can achieve the meritorious feature of the present invention.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A method for adjusting a rotation speed of a driving motor in a disk drive as a computer booting process is activated, at least comprising the steps of:
   (a) inputting an external signal into the disk drive as the computer booting process is activated;
   (b) converting said external signal into a predetermined value in such a manner to replace a default value stored within a memory device by said predetermined value such that said memory device is eventually stored with said predetermined value, wherein said default and predetermined values are different from each other; and
   (c) adjusting the rotation speed of the driving motor according to said predetermined value.

2. The method according to claim 1, wherein the disk drive includes an external panel provided with a press button, said external signal being inputted into the disk drive by pressing said press button.

3. The method according to claim 1, wherein said memory device is a non-volatile memory device and is provided within the disk drive.

4. The method according to claim 1, wherein said memory device is a volatile memory device and is provided within the disk drive.

5. The method according to claim 1, wherein said default and predetermined values are high and low rotation speeds or vice versa.

6. A disk drive comprising:
   a driving motor for driving an inserted optical disk;
   an external module for generating an external signal;
   a memory device stored with a default value;
   a converter linked to said external module and said memory device, and capable of converting said external signal inputted from said external module into a predetermined value different from said default value in such a manner to replace said default value by said predetermined value such that said memory device is eventually stored with said predetermined value; and
   a control unit for adjusting a rotation speed of the driving motor according to said predetermined value;
   wherein said converter is activated when the disk drive is booting and is de-activated after detecting and converting said external signal into said predetermined value.

7. The disk drive according to claim 6, further comprising an external panel having a press button, said external signal being generated and being inputted into said converter by pressing said press button.

8. The disk drive according to claim 6, wherein said memory device is a non-volatile memory device.

9. The disk drive according to claim 6, wherein said memory device is a volatile memory device such that said predetermined value in said volatile memory device is replaced by said default value when the disk drive is electrically disconnected from a power source.

10. The disk drive according to claim 6, wherein said preset and predetermined values are high and low rotation speeds or vice versa.

* * * * *